June 23, 1931.    E. E. STEADMAN ET AL    1,811,766
ADVERTISING SCREEN
Filed March 6, 1929    3 Sheets-Sheet 1
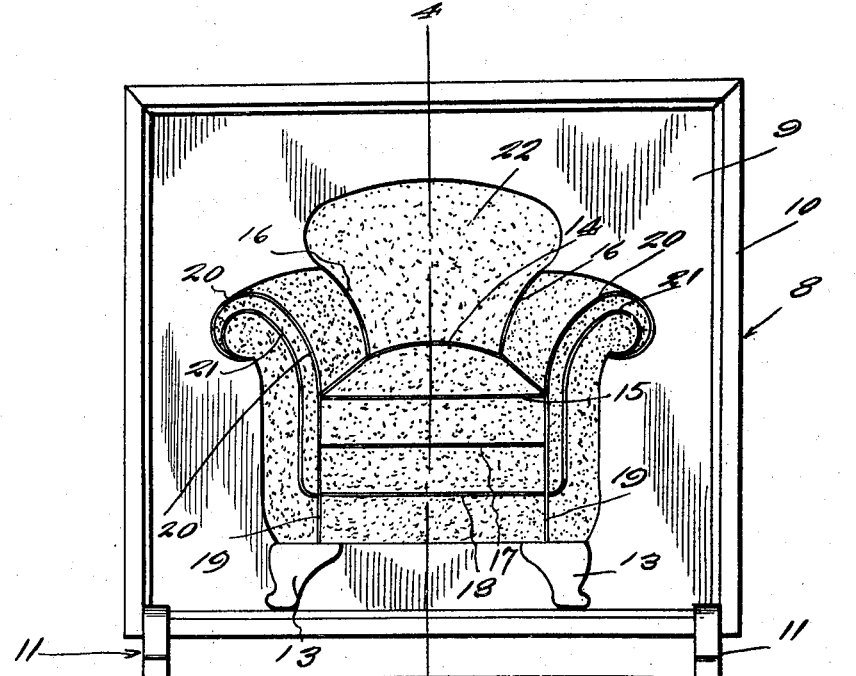
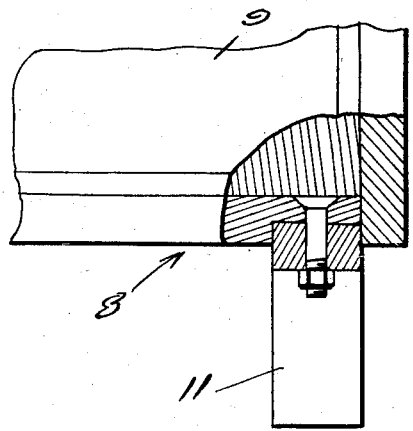
Inventor
Edwin E. Steadman
Ezekiel H. Kuhn
By Clarence A. O'Brien
Attorney June 23, 1931. E. E. STEADMAN ET AL 1,811,766
ADVERTISING SCREEN
Filed March 6, 1929   3 Sheets-Sheet 2
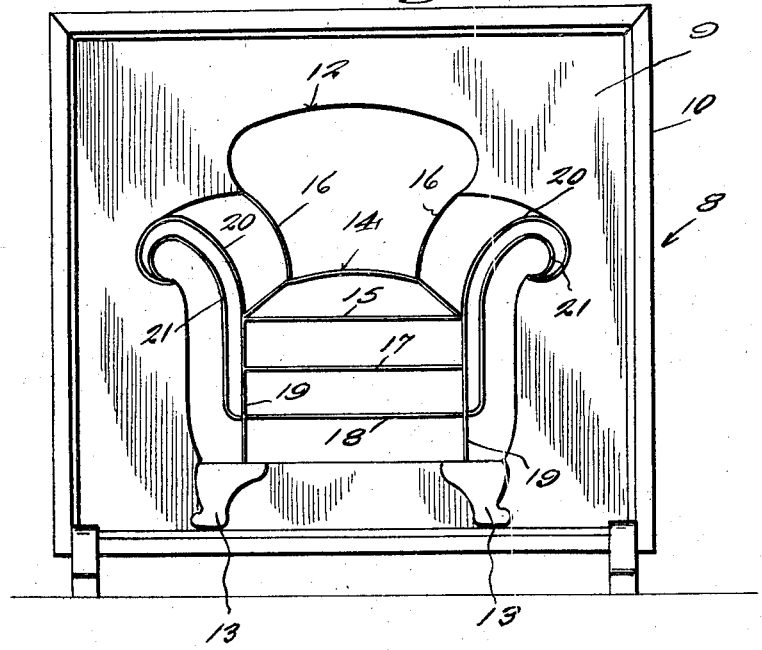
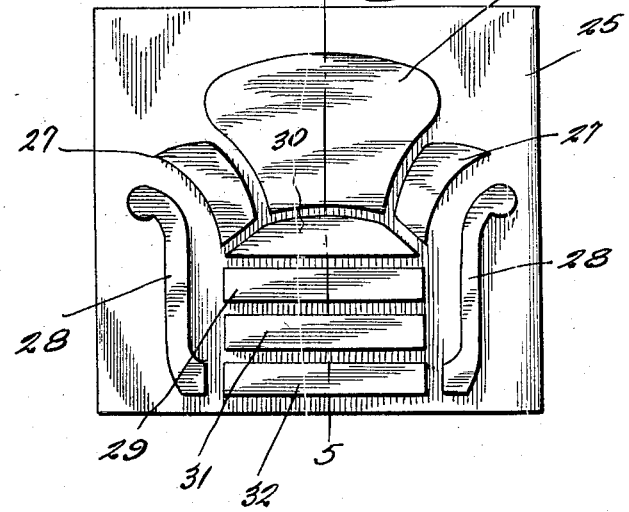
Inventor
Edwin F. Steadman
Ezekiel H. Kuhn
By Clarence A. O'Brien
Attorney June 23, 1931.　　　E. E. STEADMAN ET AL　　　1,811,766
ADVERTISING SCREEN
Filed March 6, 1929　　3 Sheets-Sheet 3
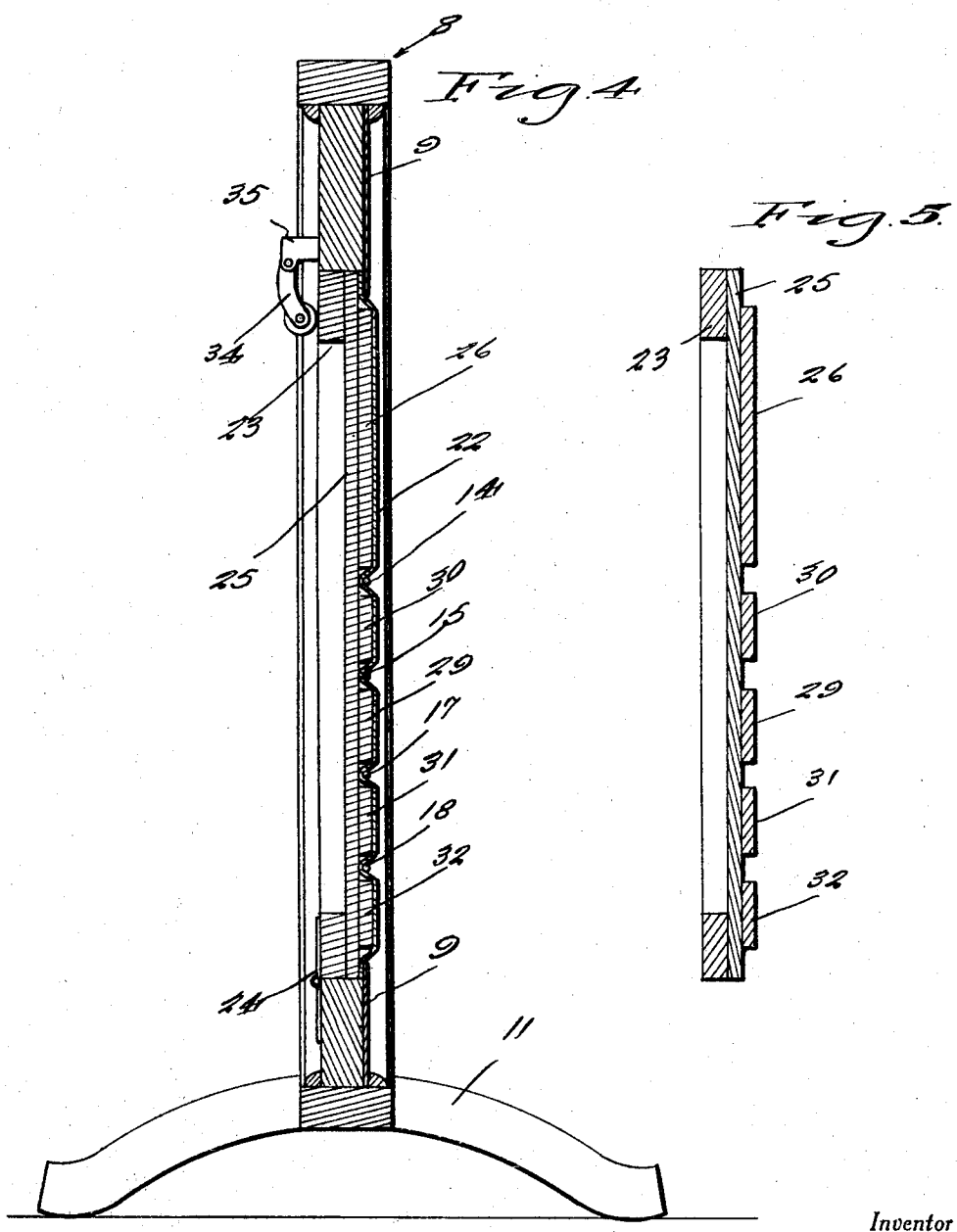
Inventor
Edwin F. Steadman
Ezekiel H Kuhn
By Clarence A. O'Brien
Attorney Patented June 23, 1931

1,811,766

UNITED STATES PATENT OFFICE

EDWIN E. STEADMAN AND EZEKIEL DONALD KUHN, OF NORTH TONAWANDA, NEW YORK; SAID KUHN ASSIGNOR TO SAID STEADMAN

ADVERTISING SCREEN

Application filed March 6, 1929. Serial No. 344,759.

This invention relates to a portable advertising device, which is especially, but not necessarily made in the form of a vertical display screen, the same being especially made to portray a perspective or isometric view of a predetermined character of object and the organization being such as to depict this image or object in an embossed or projected manner to promote realistic vision of said object.

The structure is principally intended for furniture display effects and is therefore commercially useful in various places of business. For example, it is usable to advantage for store window display and equally well adaptable for use in upholstery supply establishments, furniture manufacturing plants, and the like.

In carrying out the invention the structure has been produced, which is characterized by simplicity in arrangement of details, and a novel co-relation of parts which fulfills the requirements of an invention of this classification, in that it provides a vivid picturization of the article advertised at such perspective angle of vision as to enable the provision of an unusual optical illusion.

Briefly stated, the invention is distinguishable in the art in that it embodies an ornate screen forming an attractive background for the projected image portrayed, thereby making the structure especially useful and practicable for employment in establishments of the class enumerated.

The particular structural details and their especial association and arrangement will become more readily apparent from the following description and drawings.

In the drawings:

Figure 1 is a front elevational view of a display and advertising screen constructed in accordance with the present invention.

Figure 2 is an identical view with the retractable parts of the imitation objective removed from the panel.

Figure 3 is a front elevation of the retractable form of pattern backing detailed.

Figure 4 is an enlarged vertical sectional view taken approximately upon the plane of the line 4—4 of Figure 1.

Figure 5 is a similar view on the line 5—5 of Figure 3.

Figure 6 is a fragmentary detail elevation and section of one corner portion of the screen.

Figure 7 is a fragmentary elevational view of the rear face of the panel.

The screen shown in Figures 1 and 2 is generally designated by the reference character 8 and it comprises an ornate panel 9 of general rectangular outline and a marginal surrounding frame 10 for finishing purposes. It has been found satisfactory to make this panel 9 of sheet metal and to ornament the surface thereof for back ground appearances. The same may be of wood, suitably painted to lend attractiveness to the complete structure.

Appropriate supporting feet 11 are provided for maintaining the screen in a vertical display position. These are detachably held in place as shown in Figure 6. Referring now to Figure 2, it will be seen that the panel is formed with an opening whose outline conforms to that of the particular piece of furniture to be portrayed or depicted. In the present illustration, I have chosen to illustrate an arm chair, of a conventional type of overstuffed furniture. Consequently, the opening, in this particular instance is shaped to represent, in a perspective manner, the configuration or general outline of a chair of this particular type. The opening is generally designated by the reference character 12. It will, of course, vary in configuration, according to the particular form of chair shown. Mounted on the bottom portion of the panel are imitation legs or feet 13, and these or merely thin strips of wood appropriately painted and glued to the outer surface of the panel, in proper place.

Spanning the opening 12 and disposed in a plane with the panel is an open work wire-rod grid structure generally designated by the reference character 14. This is formed of a plurality of rods which are made to markedly define definite lines of the contour of the piece of furniture.

Take for instance, the structure seen in Figure 2. Here we see wire grid work bridging the opening. This includes a segmental frame section 15, defining the top plan configuration of the cushion. Rising from the rear corner of this are curved pieces 16, to mark the line of division between the arms and the back. There are horizontal rod members 17 and 18, cooperating with vertical rod members 19, in defining the upper and lower bands of the frontal portion of the chair. Then, too, there are curved and curled rod members 20 and 21, on opposite sides, which indicated the configuration of the frontal panels of the chair, as well as the edging welts.

By stretching a piece of fabric across this grid equipped opening, and pressing the fabric against the rod members of the grid, an overstuffed arm chair of the type seen in Figure 1 may be provided. To do this systematically and in a practical manner, I have found it convenient to provide a retractable form or pattern device for the fabric.

Incidentally the fabric is designated by the reference character 22 in Figure 1. It may be a small piece of velour, mohair, cretonne, or what not.

The backing and pattern device comprises a frame (see Figure 4), 23, hingedly mounted in the main frame, as at 24, and carrying a backing board 25, which in turn carries a multiple arrangement of form blocks.

Referring, for instance, to Figure 3, it will be seen that the blocks 26, represent the back, the blocks 27 the arm, the blocks 28 the vertical bevelled panels, and 29 the thickness of the cushion blocks 30. Then too, there are band forms 31 and 32 respectively. Of course, all of these form blocks are arranged in association as seen and spaced apart to form intervening grooves to accommodate the wire rod members of the grid. If desired, spring pressed latch rollers 34 mounted on brackets 35 may be provided on the rear side of the screen for holding the hinged pattern device in position.

In using the device, the hinged pattern member is swung rearwardly and downwardly. Then a piece of fabric is set across the entire surface thereof, the piece of material being such in area as to allow for stretching over the block and forcing into the grooves or recesses existing between the respective blocks as seen clearly in Figure 4.

Now the pattern member is swung to closed position, at which time the rod members of the grid structure become seated in the groove and the material becomes stretched tautly across the faces of the various blocks. The result is an embossed perspective display effect of an actual overstuffed arm chair as seen in Figure 1.

Obviously, a structure of this kind is especially suitable for window display purposes in a department store. These devices are comparatively light in weight and it is an easy matter for an inexperienced hand to change the display of materials from time to time. By using a number of these screens to constitute a complete suite of furniture, and by varying the shapes of the openings in the grid structure, an effective display may be had, particularly as the device is found useful for employment in upholstery supply establishments where the buyer of materials is anxious to see how the material will actually look when made up into the furniture. The clerk need only stretch one end of a bolt of material across the form and swing the form up to closed position and this will give the purchaser a clear idea as to how the complete chair will appear when made up. Obviously then the device is commercially suitable for innumerable advertising and sale purposes. The optical illusion effect of this device is unusually different in that the perspective angle of projection provides an unusually real appearance.

It is thought, however, that the invention will be quite clear after considering the description in conjunction with the drawings. Therefore, a more lengthy description is regarded as unnecessary.

Minor changes in shape, size, and rearrangement of details coming within the field of invention claimed, may be resorted to, in actual practice, if desired.

We claim:

An advertising and display device comprising a panel having an opening therein of the general shape of the article to be advertised, a backing board, form blocks on the front face of said board, each block being of a shape to simulate a part of the article, means for holding the board against the rear face of the panel with the blocks located in the opening in the panel, with fabric placed between the board and panel and covering the blocks, said blocks being spaced apart and a wire frame stretched across the opening and having its wires located to press portions of the fabric into the spaces between the blocks.

In testimony whereof we affix our signatures.

EDWIN E. STEADMAN.
EZEKIEL DONALD KUHN.